United States Patent [19]

Tsuzuki

[11] Patent Number: 5,068,805
[45] Date of Patent: Nov. 26, 1991

[54] DATA PROCESSOR FOR PROCESSING ORIGINAL IMAGE INFORMATION INTO BIT MAP DATA, HAVING MEANS FOR PERMITTING THE BIT MAP DATA TO BE ALWAYS STORED IN VARYING-CAPACITY MEMORY

[75] Inventor: Toru Tsuzuki, Okazaki, Japan
[73] Assignee: Brother Kogyo Kabushiki Kaisha, Aichi, Japan
[21] Appl. No.: 397,841
[22] Filed: Aug. 24, 1989

[30] Foreign Application Priority Data

Sep. 17, 1988 [JP] Japan .................................. 63-233063

[51] Int. Cl.$^5$ ............................................ G06F 15/62
[52] U.S. Cl. .................................................... 395/164
[58] Field of Search ............................. 364/518, 521; 340/798–800, 747, 750, 721, 723

[56] References Cited

FOREIGN PATENT DOCUMENTS 012793 7/1980 European Pat. Off. .

OTHER PUBLICATIONS

Search Report dated 12/21/89; application No. 8920823.5.

Primary Examiner—Heather R. Herndon
Attorney, Agent, or Firm—Oliff & Berridge

[57] ABSTRACT

An image data processor for processing image information representative of images, into bit map data to be used by an output device to output the images with a predetermined output resolution, and storing the bit map data into an empty area of a memory for subsequent use by the output device. The processor includes a comparator for determining whether a memory capacity required for storing first bit map data for outputting the images with a nominal output resolution is larger than a memory capacity of the empty area of the memory, and a device responsive to the comparator means, for modifying the first bit map data into second bit map data which is adapted to output the images with a reduced output resolution lower than the nominal output resolution, such that a memory capacity for storing the second bit map data does not exceed the memory capacity of the empty area of the memory, if the memory capacity required for storing the first bit map data is larger than the memory capacity of the empty area of the memory. The second bit map data is stored into the empty area of the memory.

12 Claims, 5 Drawing Sheets

DATA PROCESSOR FOR PROCESSING ORIGINAL IMAGE INFORMATION INTO BIT MAP DATA, HAVING MEANS FOR PERMITTING THE BIT MAP DATA TO BE ALWAYS STORED IN VARYING-CAPACITY MEMORY

BACKGROUND OF THE INVENTION

1. Field of the Invention

The present invention relates to an apparatus for processing image information supplied from a controller, into bit map data which is adapted for use by a display, a printer or other output device and which is stored in memory means, for subsequent use by the output device.

2. Discussion of the Prior Art

When images such as characters and graphic representations are displayed on a display device such as a cathode ray tube (CRT) according to image information supplied from a control section of a computer, the image information is generally processed into corresponding bit map data consisting of a batch of bits which correspond to picture elements available on the screen of the display device. The prepared bit map data is stored in a suitable memory of the computer such as a random-access memory (RAM), so that the bit map data is subsequently applied to the display device. Described more specifically, the image information supplied from the control section of the computer is in the form of vectorial or outline data which represent segments (straight lines and curves) that define an external profile and/or an internal profile of an image such as a character. For instance, a straight segment of an image is represented by a vector defined by a start point and an end point of the segment. The vectorial data is converted into bit map data adapted to display the appropriate images with a predetermined output resolution. The computer determines whether the memory capacity of the empty or vacant area of the memory (e.g., RAM) is large enough to store the obtained bit map data. If the memory capacity required for storing the bit map data is equal to or smaller than the memory capacity of the empty area of the memory, the bit map data is stored in the empty area of the memory.

It is noted that the above-indicated memory such as a random-access memory whose empty area is used as a memory for storing the bit map data is usually used for other purposes, for example, as a working memory for storing in-process data used for a central processing unit, and a text memory for storing the vectorial image information indicated above. Accordingly, the memory capacity of the empty area of the relevant memory may be smaller than the memory capacity required for storing bit map data for a given batch of image information. In this event, an alarm is constituted to indicate the insufficiency of the empty memory area for storing the relevant bit map data, and an operation to store the bit map data is inhibited. Consequently, the bit map data corresponding to the source image information supplied from the control section of the computer is not applied to the CRT or other display device, and the relevant images cannot be displayed.

A similar problem is encountered when images are printed or recorded according to corresponding bit map data which is prepared based on the source image information, since the memory capacity of the empty area of a memory for the bit map data may be insufficient for storing the bit map data.

SUMMARY OF THE INVENTION

Therefore, it is an object of the present invention to provide an image data processor which is capable of processing source image information into bit map data for use by an output device, such that an output resolution of images produced according to the prepared bit map data is lowered from the nominal value, so as to permit the bit map data to be almost always stored in an empty area of a suitable memory, if the memory capacity of the empty area is insufficient to store the bit map data which is normally prepared from the source image information to output the images with the nominal resolution.

The above object may be achieved according to the principle of the present invention, which provides an image data processor for processing image information representative of images, into bit map data to be used by an output device to output the images with a predetermined output resolution, and for storing the obtained bit map data into an empty area of memory means, for subsequent use by the output device, the processor comprising: comparator means for determining whether a memory capacity required for storing first bit map data for output the images with a nominal output resolution is larger than a memory capacity of the empty area of the memory means, or not; modifying means responsive to the comparator means, for modifying the first bit map data into second bit map data which is adapted to output the images with a reduced output resolution lower than the nominal output resolution, such that a memory capacity for storing the second bit map data does not exceed the memory capacity of the empty area of the memory means, if the memory capacity required for storing the first bit map memory is larger than the memory capacity of the empty area of the memory means; and storing means for storing the second bit map data into the empty area of the memory means. Obviously, the first bit map data is stored in the empty area of the memory means if the empty area has a sufficient memory capacity for storing the first bit map data. The images represented by the source image information is therefore outputted on the output device, with the nominal or suitably reduced output resolution.

In the image data processor of the present invention constructed as described above, the first bit map data which is normally prepared from the image information so as to output the corresponding images with the predetermined nominal output resolution is modified into the second bit map data which permits the images to be produced with a suitably reduced output resolution, if the memory capacity of the empty area of the memory means is insufficient to store the first bit map data. Accordingly, the second bit map data prepared for the reduced output resolution of the images can be almost always stored in the empty area of the memory means, and the images can be produced by the output device such as a display or printing device, according to the second bit map data, even when the amount of the bit map data for the nominal output resolution, i.e., the amount of the first bit map data exceeds the memory capacity of the empty area of the memory means.

The image data processor may further comprise calculating means for calculating the memory capacity of the empty area of the memory means, which may vary from time to time, so that the comparator means compares the memory capacity required for storing the first bit map data, with the memory capacity calculated by the calculating means.

The bit map data is applied to a desired output device. For example, the output device may be a cathode ray tube or other display device for displaying the appropriate images, according to the first or second bit map data, or a suitable recording or printing mechanism for recording the images according to the first or second bit map data.

The reduced output resolution obtained by the second bit map data may be the same in both of a vertical and a horizontal direction in a plane in which the images are produced on the output device. Alternatively, the reduced output resolution is lower than the nominal resolution, in one of the vertical and horizontal directions. In this case, if the memory capacity for storing the second bit map data prepared for reducing the output resolution in the above indicated one direction only is still larger than the memory capacity of the empty area of the memory means, the output resolution is lowered with respect to the nominal resolution, also in the other direction.

The image data processor may further comprise means for determining whether the reduced output resolution reaches a predetermined limit, and means for disabling the modifying means. In this case, a suitable alarm may be constituted if the predetermined limit is reached.

BRIEF DESCRIPTION OF THE DRAWINGS

The above and optional objects, and features of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
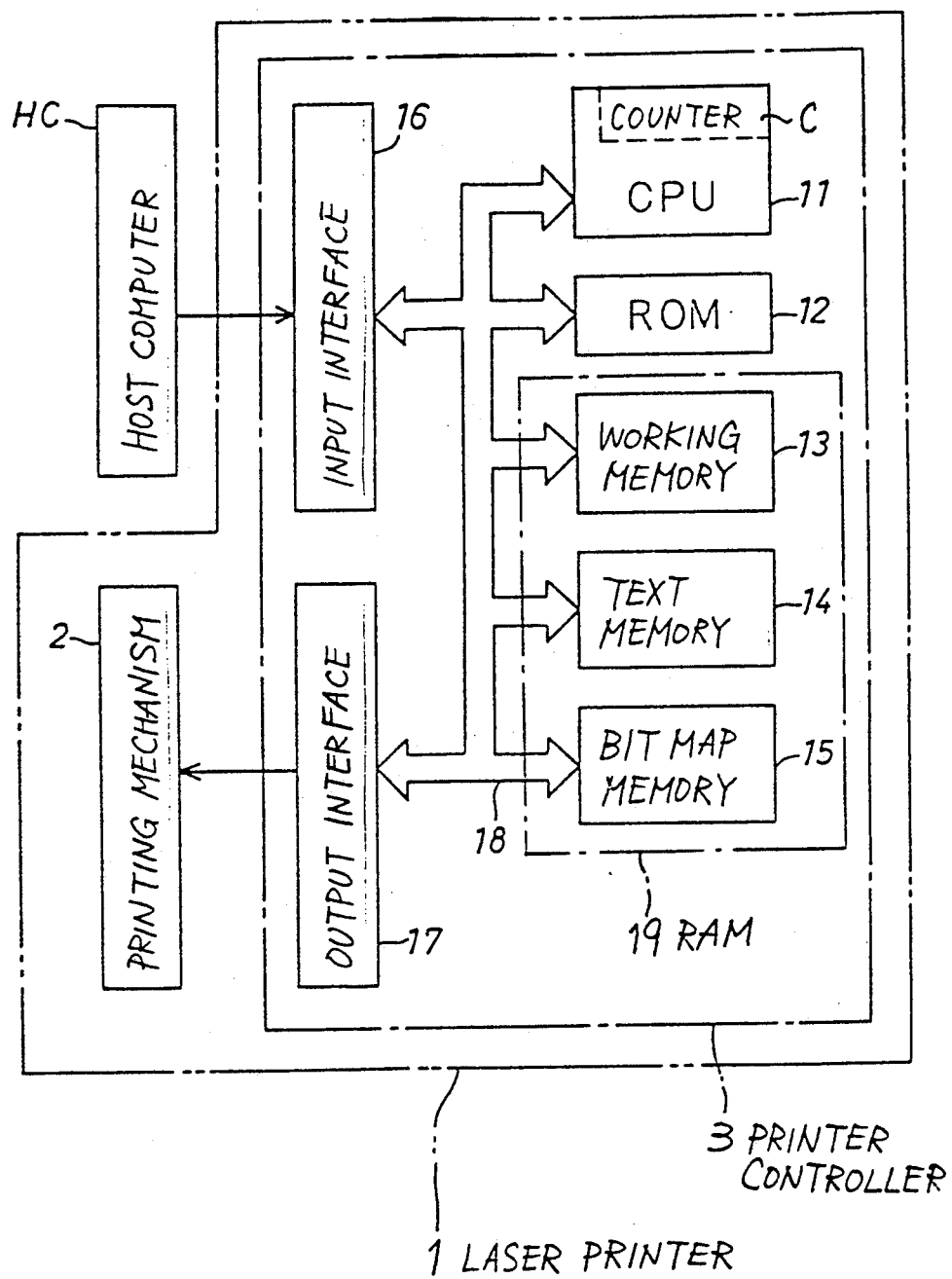
FIG. 1 is a schematic block diagram showing a laser printer which incorporates an image data processor constructed according to one embodiment of the invention.

Referring first to FIG. 1, reference numeral 1 generally denotes a laser printer which has a printing mechanism 2, and an image data processor in the form of a printer controller 3 constructed according to one embodiment of the present invention.

The printing mechanism 2 has a well known laser printing arrangement which includes a laser emitting element, a polygon mirror and a photosensitive drum. The printing mechanism 2 is operated under the control of the printer controller 3, for effecting a laser printing on a recording medium, according to source image information received from a host computer HC.

The source image information supplied from the host computer HC represent images to be printed by the printing mechanism 2. Usually, the source image information represent two or more pages of images, and the printer controller 3 controls the printing mechanism 2 so that the images are printed one page after another. The printer controller 3 is an arithmetic and logic unit which includes a central processing unit (CPU) 11, and a read-only memory (ROM) 12 which stores various control programs used by the CPU 11 to control the printing mechanism 2. The controller 3 further includes a random-access memory (RAM) 19 which is utilized as a working memory 13, a text memory 14 and a BIT MAP memory 15. The working memory 13 temporarily stores various data for arithmetic and logic operations, and the text memory 14 stores the source image information received from the host computer HC. The BIT MAP memory 15 is adapted to store bit map data representative of one page of images. The bit map data for each page is prepared by the CPU 11, based on the corresponding set of the image information stored in the text memory 14, and is applied to the printing mechanism 2. Since the amounts of data stored in the working memory 13 and text memory 14 vary from time to time, the memory capacity of the RAM 19 that can be used as the BIT MAP memory 15 also varies from time to time. Namely, the capacity of the BIT MAP memory 15 varies during operation of the laser printer 1.

The printer controller 3 also has: an input interface through which the image information from the host computer HC is received by the CPU 11; an output interface 17 through which control signals and the bit map data representative of the images to be printed are supplied from the CPU 11 to the printing mechanism 2; and a bus line 18 which interconnects the CPU 11, ROM 12, RAM 19 and input and output interfaces 16, 17. The CPU 11 incorporates a counter C which will be described.

Figure 2:
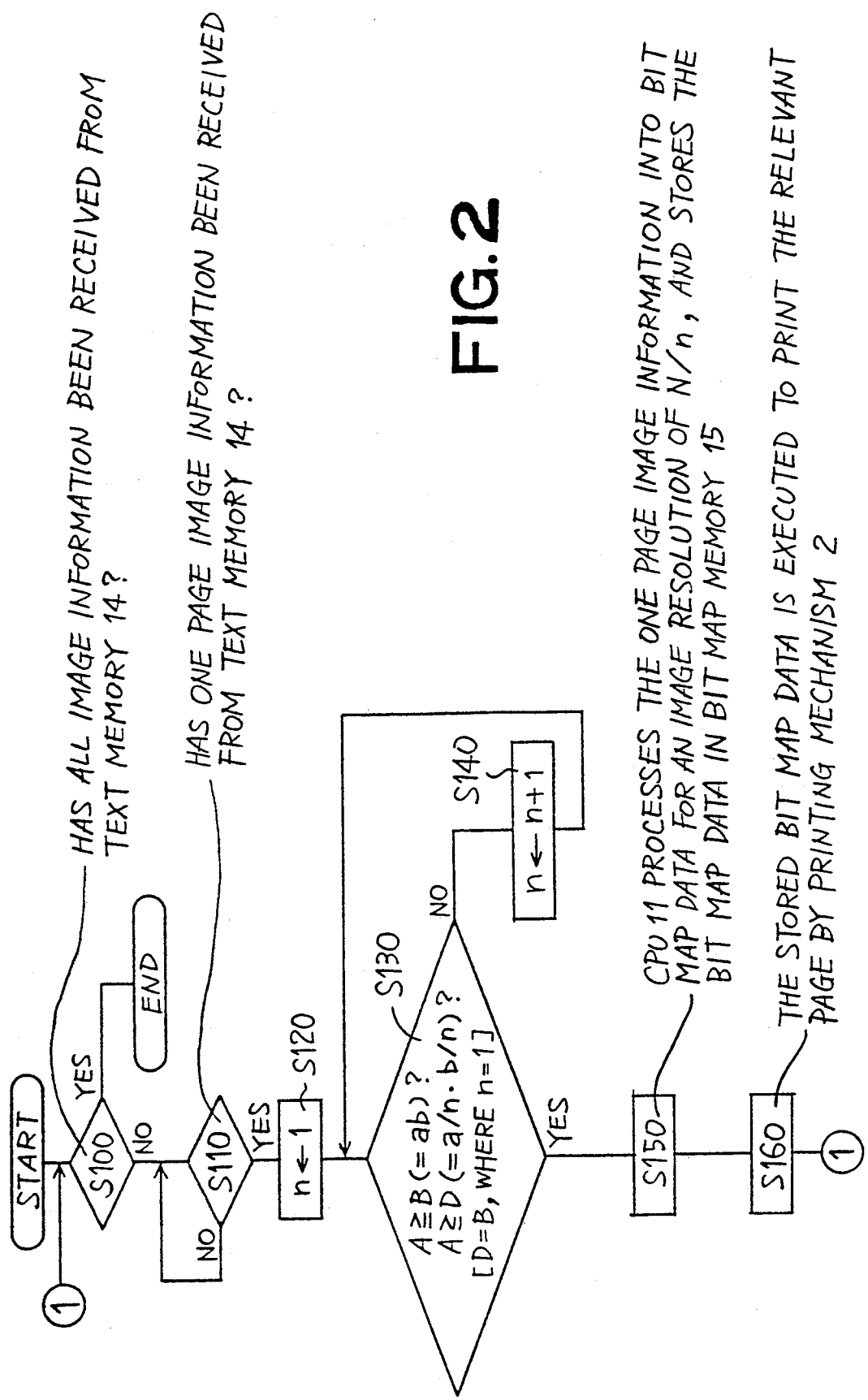
FIG. 2 is a flow chart illustrating a control routine executed by the image data processor of the printer of FIG. 1.

Referring next to the flow chart of FIG. 2, there will be described an operation of the printer controller 3 as an image data processor according to one form of the invention.

The CPU 11 implements the following data processing operations, according to the control programs stored in the ROM 12, while utilizing the temporary data storage function of the working memory 13:

(1) a) Receiving from the host computer HC the vectorial image information indicative of vectors which define segments representing desired source images such as characters, figures and other graphical representations, and b) storing the received vectorial image information in the text memory 14; and (2) c) Retrieving the image information from the text memory 14, one page at a time, d) converting the retrieved image information into a corresponding batch of bit map data adapted to be useable by the printing mechanism 2, e) storing the prepared bit map data into the BIT MAP memory 15 (empty area of the RAM 19), and f) applying the bit map data to the printing mechanism 2 through the output interface 17.

The process steps of the operation (2) indicated above will be described in greater detail by reference to the flow chart of FIG. 2.

Initially, the control flow goes to step S100 to check if the CPU 11 has received and processed the entire image information from the text memory 14. This checking can be accomplished by determining whether text end data indicative of the end of the image information is present or not, or whether a predetermined time has passed after the CPU 11 is set ready for receiving the image information from the text memory 14. If an affirmative decision (YES) is obtained in step S100, the control routine of FIG. 2 is terminated. If a negative decision (NO) is obtained in step S100, the control flow goes to step S110 to determine whether the image information corresponding to one page of images has been received from the text memory 14, or not. Step S110 is repeatedly executed until the one page of image information has been retrieved by the CPU 11.

If an affirmative decision (YES) is obtained in step S110, step S120 is implemented to increment the content "n" of the counter C. In the first control cycle, the content "n" is set to "1". Then, the control flow goes to step S130 to determine whether a memory capacity "A" of the BIT MAP memory 15 (i.e., currently empty or vacant area of the RAM 19) is equal to or larger than a memory capacity "B" required for storing the bit map data which is prepared based on the corresponding source image information in the text memory 14, so as to produce the appropriate images with a predetermined nominal output resolution "N" (number of picture elements per unit length=number of image data bits per unit length).

Figure 3A:
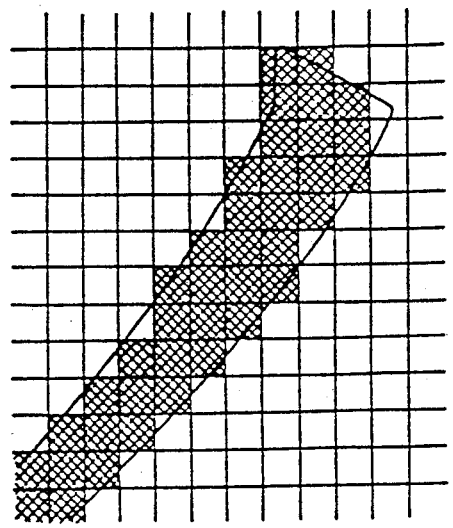
FIG. 3(a) is a view illustrating an image represented by bit map data for a nominal output resolution.
Figure 4:
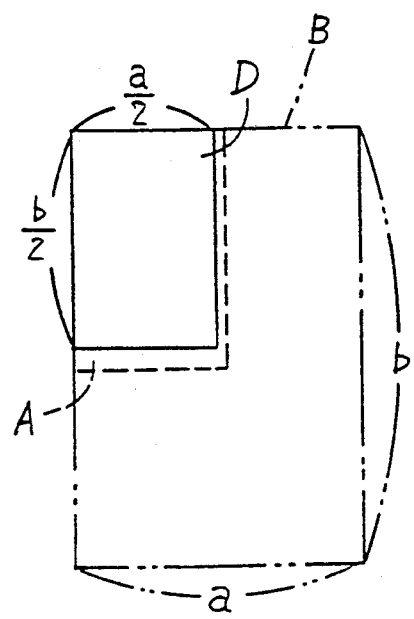
FIG. 4 is an illustration for explaining a reduction in the required volume of a bit map memory for storing the modified bit map data.

FIG. 3(a) shows an image produced with the nominal output resolution "N". This image is a Japanese "katakana" letter "/". FIG. 4 illustrates the required memory capacity "B" indicated above, which corresponds to the nominal output resolution "N", namely, the memory capacity "B" for the bit map data prepared where the content "n" of the counter C is equal to "1". For convenience' sake, this bit map data is referred to as "first bit map data". As indicated in FIG. 4, the required memory capacity "B" considered in the first control cycle (where n=1) is schematically represented by a surface area "ab".

The data indicative of the varying memory capacity "A" of the BIT MAP memory 15 is stored in an address register within the CPU 11, and is updated when the bit map data is stored and retrieved into and from the memory 15. If a negative decision (NO) is obtained in step S130 in the first control cycle wherein n=1, step S130 is followed by step S140 in which the content "n" of the counter C is incremented. That is, if the required memory capacity "B" (=ab) for storing the first bit map data is larger than the current memory capacity "A" of the BIT MAP memory 15, as indicated in FIG. 4, the content "n" of the counter C is set to "2", and the control flow goes back to step S130.

Figure 3B:
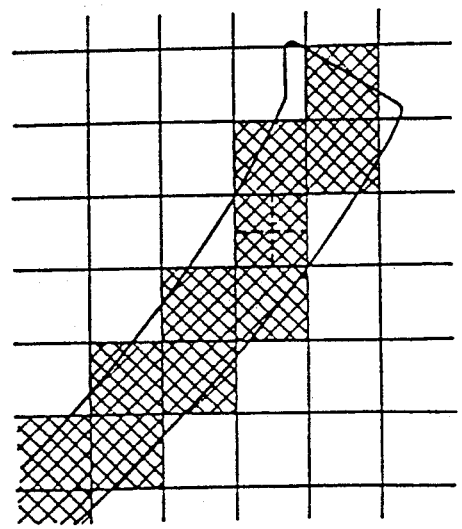
FIG. 3(b) is a view illustrating the same image represented by modified bit map data for a reduced output resolution which is one half of the nominal resolution.

In this second control cycle, the CPU 11 determines in step S130 whether the memory capacity "A" of the BIT MAP memory 15 is equal to or larger than a memory capacity "D" required for storing bit map data for producing the images with a reduced output resolution "N/n", namely, "N/2". This reduced output resolution "N/2" is illustrated in FIG. 3(b), wherein the number of image data bits is reduced to one half of the nominal number "N". As indicated in FIG. 4, the memory capacity "D" is schematically represented by a surface area "a/n·b/n". For convenience' sake, the bit map data corresponding to the reduced output resolution "N/n" is referred to as "second bit map data", where "n" is larger than "1".

If the memory capacity "A" of the BIT MAP memory 15 is equal to or larger than the required memory capacity "B", step S130 is followed by step S150 wherein the CPU 11 converts the image information into the first bit data map for the nominal output resolution, and stores the prepared first data map into the BIT MAP memory 15. This case can occur only in the first control cycle in which n=1, and step S130 is immediately followed by step S150.

If the memory capacity "A" of the BIT MAP memory 15 is equal to or larger than the required memory capacity "D" in the second or subsequent control cycle in which "n" is larger than "1", the CPU 11 modifies the first bit map data into the suitable second bit map data in step S150, namely, prepares the second bit map data based on the image information in the text memory 14, so that the prepared second bit map data produces the relevant images with the suitably reduced output resolution "N/n". The prepared second bit map data is stored in the BIT MAP memory 15.

Step S150 is followed by step S160 in which the first or second bit map data is retrieved from the BIT MAP memory 15 and is applied to the printing mechanism 2, so that one page of images represented by the bit map data are printed on the recording medium.

It will be understood from the above description that the content "n" of the counter C is incremented (in step S140) until the required memory capacity "D" (=a/n·b/n) for the second bit map data is reduced to the memory capacity "A" of the BIT MAP memory 15. Thus, step S140 and step S130 are repeatedly executed until the condition of step S130 is satisfied. The reduced output resolution "N/n" results in increasing the image area per each image data bit by a multiple of $n^2$, as compared with the image area according to the nominal output resolution "N", whereby the number of image data bits of the bit map data for the one page of images is reduced to $1/n^2$. In the case of FIG. 3(b), the number of image data bits (each indicated by a square) according to the output resolution of N/2 is reduced to one fourth of that of FIG. 3(a) according to the nominal resolution "N". In FIGS. 3(a) and 3(b), the hatched squares indicate a logical value of "1", while the non-hatched squares indicate a logical value of "0". It will therefore be understood that the second bit map data for the reduced output resolution "N/n" causes an increase in the number of printing dots per image data bit, which dots correspond to the picture elements on the screen of a display device.

It will also be understood that the required capacity of the BIT MAP memory 15 for storing the bit map data can be reduced to $1/n^2$, by preparing the bit map data (second bit map data) so as to print the relevant images with the reduced output resolution "N/n", i.e., by lowering the output resolution from the nominal value "N" to "N/n", e.g., N/2, N/3, N/4. This arrangement makes it possible to store the bit map data corresponding to the source image information, in the BIT MAP memory 15, even if the memory capacity "A" of the memory 15 is smaller than the capacity "B" required for storing the first or normal bit map data for the nominal output resolution "N". Thus, the printer controller 3 enables the printing mechanism 2 to print a page even when the amount of information on that page is considerably larger than those of the other pages.

Although the present embodiment is adapted to reduce the output resolution by the same amount in both of the vertical and horizontal directions (a/n, b/n) in the plane in which the images are printed, as illustrated in FIG. 4, it is possible that the output resolution is lowered in one of the vertical and horizontal directions.

Figure 5A:
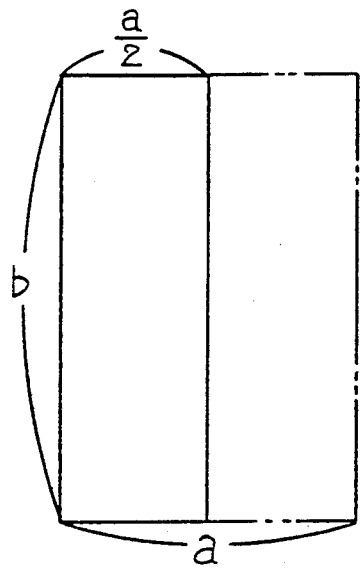
FIGS. 5(a), 5(b), 5(c) and 5(d) are views showing a manner of modifying the bit map data, according another embodiment of the invention.
Figure 5B:
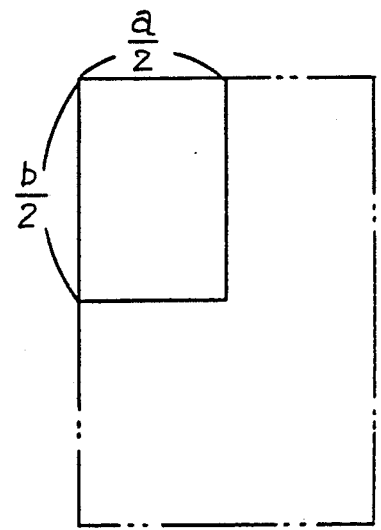
Figure 5C:
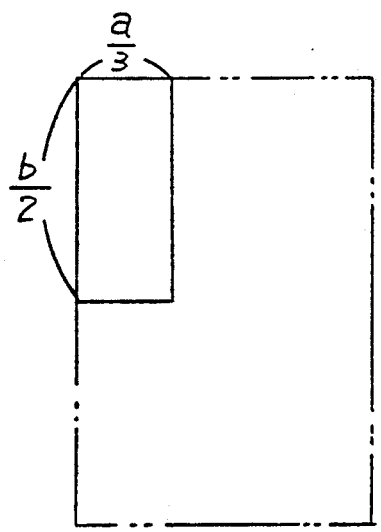
Figure 5D:
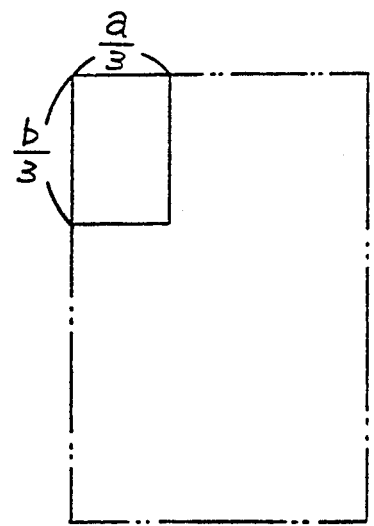

An example of this arrangement is illustrated in FIGS. 5(a), 5(b), 5(c) and 5(d). More particularly, the output resolution "N" is first lowered in the horizontal direction by a/2, for example, as indicated in FIG. 5(a). If this reduction in the resolution does not permit the corresponding bit map data to be stored in the BIT MAP memory 15, the resolution is then lowered also in the vertical direction by b/2, for example, as indicated in FIG. 5(b). If this further reduction in the resolution is not sufficient, then the resolution is lowered by an increased amount in the horizontal direction, for example, by a/3, as indicated in FIG. 5(c). If this does not satisfy the requirement of step S130, the resolution is lowered by an increased amount also in the vertical direction, for example, by b/3, as indicated in FIG. 5(d).

Figure 6:
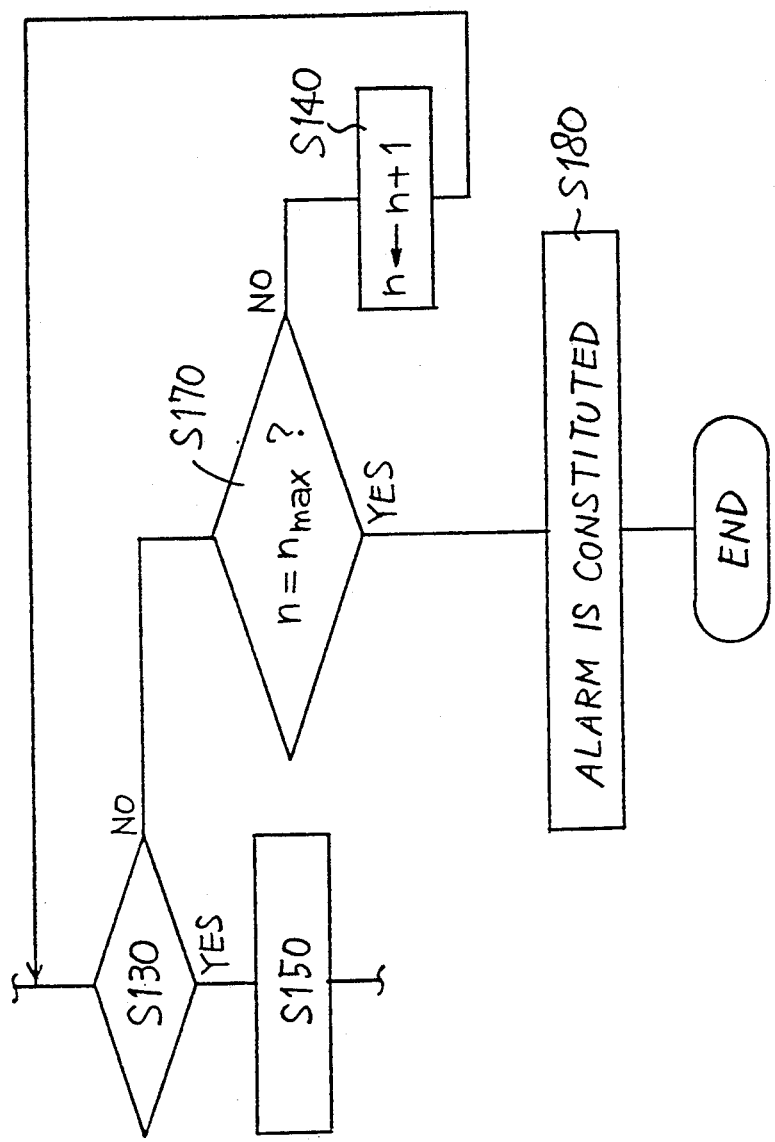
FIG. 6 is a flow chart showing a further embodiment of the invention.

It will be obvious that a maximum permissible content "n" of the counter C, that is, a lower limit of the output resolution "N/n" may be provided to avoid an excessively low output resolution of the images printed. In this case, the control flow is modified as indicated in FIG. 6, wherein step S170 is provided to check if the content "n" of the counter C has reached a predetermined maximum permissible value "$n_{max}$". If a negative decision (NO) is obtained in step S170, the control flow goes to step S140 described above. If an affirmative decision (YES) is obtained in step S170, i.e., if the predetermined maximum permissible value $n_{max}$ is reached, step S170 is followed by step S180 in which a suitable alarm is activated to inhibit the CPU 11 from storing bit map data into the BIT MAP memory 15, and to provide an indication of this fact. In this event, the control flow is terminated.

Figure 7:
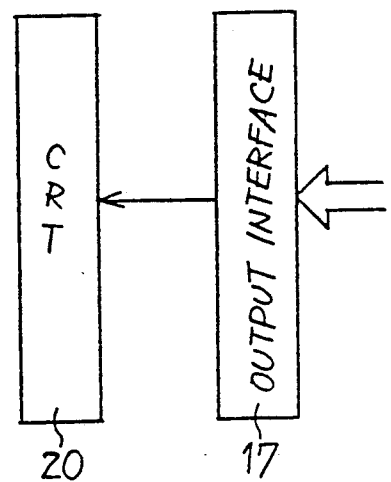
FIG. 7 is a fragmentary block diagram illustrating a still further embodiment of the invention.

While the presently preferred embodiments of the present invention as applied to a laser printer have been described and illustrated by way of example only, it is to be understood that the principle of the invention is applicable to an image data processor for controlling a display device such as a cathode ray tube (CRT), for displaying images according to bit map data supplied from the BIT MAP memory 15. In this case, the output interface 17 is connected to the display device, for example, to a cathode ray tube 20, as illustrated in FIG. 7.

It will be obvious that the present invention may be embodied with various other changes, alterations, modifications and improvements, which may occur to those skilled in the art, without departing from the spirit and scope of the invention defined in the following claims.

What is claimed is:

1. An image data processor for processing image information representative of images, into bit map data to be used by an output device to output said images with a predetermined output resolution, and storing the bit map data into a bit map memory of memory means, for subsequent use by said output device, said memory means being used to also store data other than said bit map data, and said bit map memory consisting of an empty area of said memory means which varies with a volume of said data other than said bit map data, so that a memory capacity of said bit map memory varies from time to time, said processor comprising:

calculating means for calculating said memory capacity of said bit map memory;

comparator means responsive to said calculating means, for determining whether a memory capacity required for storing first bit map data for outputting said images with a nominal output resolution is larger than said memory capacity of said bit map memory which is calculated by said calculating means;

modifying means responsive to said comparator means, for modifying said first bit map data into second bit map data if said memory capacity required for storing said first bit map data is larger than the calculated memory capacity of said bit map memory, said second bit map data being prepared to output said images with a reduced output resolution lower than said nominal output resolution, such that a memory capacity required for storing said second bit map data does not exceed the memory capacity of said bit map memory.

2. An image data processor according to claim 1, wherein said output device comprises a display device for displaying said images, according to said first bit map data if said memory capacity required for storing said first bit map data does not exceed said capacity of said bit map memory, or according to said second bit map data if said memory capacity required for storing said first bit map data exceeds said memory capacity of said bit map memory.

3. An image data processor according to claim 1, wherein said output device comprises a printing mechanism for recording said images, according to said first bit map data if said memory capacity required for storing said first bit map data does not exceed said memory capacity of said bit map memory, or according to said second bit map data if said memory capacity required for storing said first bit map exceeds said memory capacity of said bit map memory.

4. An image data processor according to claim 1, wherein said modifying means prepares said second bit map data such that said reduced output resolution is the same in both of a vertical and a horizontal direction in a plane in which said images are outputted.

5. An image data processor according to claim 4, further comprising judging means for determining whether said reduced output resolution reaches a predetermined limit, and means for disabling said modifying means if said judging means determines that said reduced output resolution reaches said predetermined limit.

6. An image data processor according to claim 1, further comprising judging means for determining whether said reduced output resolution reaches a predetermined limit, and means for disabling said modifying means if said judging means determines that said reduced output resolution reaches said predetermined limit.

7. An image data processor according to claim 1, wherein said modifying means prepares said second bit map data, if said memory capacity required for storing said first bit map data exceeds said memory capacity of said bit map memory, such that said reduced output resolution is lower than said nominal output resolution, in one of a vertical and a horizontal direction in a plane in which said images are outputted, said modifying means further modifying said second bit map data, if said memory capacity required for storing said second bit map data prepared for reducing the output resolution in said one direction only is still larger than said memory capacity of said bit map memory, said second bit map data being modified such that said reduced output resolution is lower than said nominal output resolution, in the other of said vertical and horizontal direction as well as in said one direction.

8. An image data processor according to claim 7, further comprising judging means for determining whether said reduced output resolution reaches a predetermined limit, and means for disabling and modifying means if said judging means determines that said reduced output resolution reaches said predetermined limit.

9. An image data processor according to claim 1, further comprising judging means for determining whether said reduced output resolution reaches a predetermined limit, and means for disabling said modifying means if said judging means determines that said reduced output resolution reaches said predetermined limit.

10. An image data processor according to claim 1, wherein said memory means includes a text memory for storing a batch of said image information as said data other than said bit map data, a predetermined volume of said image information being converted at a time into a corresponding set of bit map data, said memory capacity required for storing said first bit map data being equal to a capacity for requiring for storing the bit map data which corresponds to said predetermined volume of said image information.

11. An image data processor according to claim 10, wherein said image information consists of outline data representative of an outline of said images.

12. An image data processor according to claim 11, wherein said outline data consists of vector data representative of segments of said outline of said images.

* * * * *